United States Patent [19]

Wallace et al.

[11] Patent Number: 4,647,509

[45] Date of Patent: Mar. 3, 1987

[54] THERMOFORMABLE MULTILAYER BARRIER STRUCTURES

[75] Inventors: Theodore C. Wallace, Midland; Bernie A. Kozakiewicz, Bay City, both of Mich.

[73] Assignee: The Dow Chemical Company, Midland, Mich.

[21] Appl. No.: 785,306

[22] Filed: Oct. 7, 1985

[51] Int. Cl.$^4$ ............ B32B 27/06; B32B 27/34; B32B 27/08

[52] U.S. Cl. ............... 428/474.9; 428/475.8; 428/476.1; 428/476.3; 428/476.9; 428/516; 428/518; 428/520; 428/903.3; 264/176.1; 156/244.11; 156/244.27

[58] Field of Search ......... 428/516, 518, 520, 474.9, 428/903.3, 475.8, 476.1, 476.3, 476.9

[56] References Cited

U.S. PATENT DOCUMENTS

| | | |
|---|---|---|
| 3,131,069 | 4/1964 | Goller et al. ............ 99/174 |
| 3,524,795 | 8/1970 | Peterson . |
| 3,793,135 | 2/1974 | Monia . |
| 3,857,754 | 12/1974 | Hirata et al. . |
| 3,940,001 | 2/1976 | Haefner et al. . |
| 3,955,697 | 5/1976 | Valyi . |
| 3,977,153 | 8/1976 | Schrenk . |
| 4,048,361 | 9/1977 | Valyi . |
| 4,057,667 | 11/1977 | Wiggins et al. . |
| 4,112,181 | 9/1978 | Baird, Jr. et al. . |
| 4,161,562 | 7/1979 | Yoshikawa et al. . |
| 4,234,663 | 11/1980 | Catte et al. ............ 428/517 |
| 4,379,117 | 4/1983 | Baird, Jr. et al. ............ 264/514 |
| 4,386,188 | 5/1983 | Grancio et al. ............ 525/96 |
| 4,452,846 | 6/1984 | Akao ............ 428/516 X |
| 4,548,988 | 10/1985 | Castelein ............ 525/71 |

FOREIGN PATENT DOCUMENTS 47-679022 7/1972 Japan .

Primary Examiner—P. C. Ives
Attorney, Agent, or Firm—L. E. Hessenaur, Jr.

[57] ABSTRACT

A multilayer thermoformable packaging material is provided and includes one layer of barrier material containing a resin having low gas and vapor transmission properties. The multilayer structure also includes one layer which utilizes scrap produced from the multilayer structure. Other optional layers may be included in the structure to provide additional features such as rigidity and toughness.

27 Claims, No Drawings

THERMOFORMABLE MULTILAYER BARRIER STRUCTURES

BACKGROUND OF THE INVENTION

This invention relates to a multilayer structure, and more particularly to a multilayer thermoformable packaging material including a barrier layer and at least one layer which utilizes scrap produced from the multilayer structure.

Processes for molding or otherwise shaping plastic sheets or film into containers, packaging, and the like utilizing thermoforming techniques have been available for many years. A typical thermoforming process heats a thermoplastic sheet to its softening point and then shapes the sheet at a forming station utilizing various molds and/or vacuum or air pressure assists. Other thermoforming techniques include solid phase pressure forming (SPPF) and the so-called scrapless forming process (SFP). For purposes of this disclosure, references to thermoforming techniques or thermoformable structures will include SPPF and SFP.

Olefin polymers, such as polyethylene and polypropylene, offer desirable physical properties in container and packaging design such as high heat distortion temperatures, toughness, and resistance to environmental stress cracking. However, in part due to their relatively sharp melting points and low melt strength, polyolefin homopolymers or coextruded homopolymer structures cannot be practically thermoformed on conventional standard equipment.

One approach to this problem is illustrated by Grancio et al, U.S. Pat. Nos. 4,386,187 and 4,386,188. Grancio et al teach a thermoformable polymer blend of a polyolefin, such as polyethylene, with polystyrene and a compatibilizing styrene-butadiene-styrene block copolymer. The polystyrene component of the blend improves the processability of the composition so that it can be readily thermoformed.

Other container and packaging applications require a plastic film which has low moisture vapor and gas transmission rates, i.e., so-called barrier films. Such barrier films are particularly desirable in the packaging of foods such as meats and cheeses. However, plastics which provide good barrier properties in many instances do not possess properties necessary for conventional thermoforming techniques. Thus, the prior art has utilized multilayer plastic film structures incorporating a barrier layer in an attempt to overcome this problem.

For example, Peterson, U.S. Pat. No. 3,524,795, teaches a thermoformable multilayer packaging material employing polyolefin outer layers with an inner barrier layer of Saran; the layers are adhered together with a bonding agent such as a copolymer of ethylene and vinyl acetate. Other prior art teachings of thermoformable multilayer containers and films include French Pat. No. 1,401,433; Monia, U.S. Pat. No. 3,793,135; Valyi, U.S. Pat. Nos. 3,955,697 and 4,048,361; Wiggins, U.S. Pat. No. 4,057,667; Yoshikawa et al, U.S. Pat. No. 4,161,562; and Catte, U.S. Pat. No. 4,234,663. Many of these references also teach the use of bonding agents to adhere incompatible layers together.

However, the use of thermoformable multilayer materials often results in considerable quantities of scrap being formed from the processing operations. Such scrap either cannot be recycled or is at best difficult to recycle because the various layers normally have incompatible plastic resin compositions. One approach to this scrap problem is exemplified by Haefner, U.S. Pat. No. 3,940,001 and Schrenk, U.S. Pat. No. 3,977,153. There it is taught to separate the loosely adhered individual layers prior to recycling.

However, such an approach is feasible only in those instances where the multilayer structure is useable in applications where the individual layers need not be securely adhered together. In those instances where the multilayer structure has been formed as true laminate, the layer cannot be separated for recycle. The Catte patent, listed above, teaches that scrap from a multilayer film can be incorporated as a component of a layer positioned intermediate of layers of polyolefin and a polystyrene, respectively. However, Catte teaches the necessity of combining a bonding agent with the scrap to form the intermediate layer. Moreover, none of the layers of Catte acts as a barrier layer.

Accordingly, the need still exists in the art for a multilayer thermoformable material which utilizes scrap produced from the multilayer structure. In addition there is a need for such a material which utilizes scrap and which incorporates a barrier layer. Further, there is a need for such a material utilizing scrap in which the individual layers are compatible and may be adhered directly to one another without the need for an intermediate bonding agent.

SUMMARY OF THE INVENTION

In accordance with one aspect of the present invention, there is provided thermoformable multilayer barrier structures having at least first and second layers. The first layer is a barrier layer. By barrier layer, it is meant a resinous material having an oxygen permeation rate of 5 or lower as measured in cc per mil per 100 sq. in. per day per atmosphere at 23° C. Preferably the barrier layer comprises a blend of (a) a vinylidene chloride copolymer, the copolymer having polymerized therein vinylidene chloride in an amount of from about 40 to about 98 percent by weight of copolymer and at least one monoethylenically unsaturated monomer copolymerizable therewith in an amount of from about 60 to about 2 percent by weight of copolymer; (b) a compatible or incompatible polymer; and (c) a sufficient amount of a compatibilizing agent when an incompatible polymer is used. Certain polyester resins may be used as the compatible polymer. As an incompatible polymer, polyolefins and nylons are preferred. When an incompatible nylon is used, the compatibilizing agent may be a polyether blockamide (80/20 amide to ether). When an incompatible olefin polymer is used the compatibilizing agent may be an ethylene copolymer having polymerized therein from about 97 to about 60 weight percent ethylene and from about 3 about 40 weight percent of at least one copolymerizable oxygen containing monomer, or may be a halogenated olefin polymer having from about 24 to about 44 percent by weight halogen.

The second layer comprises a blend of (a) from 1 to 99% by weight of a blend of an olefinic polymer, a styrenic polymer, and a sufficient amount of a compatibilizing polymer for the olefinic and styrenic polymers; and (b) from 99 to 1% by weight of scrap material which has been produced from the first and second layers of the film laminate. Thus, the second layer contains a blend of both virgin material and recycled scrap (regrind), with the recycled scrap including material from the first barrier layer.

Surprisingly, the first barrier layer and second scrap-containing layer can be fabricated into a multilayer structure using conventional coextrusion techniques without the need for an intervening bonding agent or layer. Moreover, the present invention permits the complete recycle of scrap from thermoforming operations into the multilayer structure without adverse effect on the properties of the structure.

Additional layers of plastic resins may be included in the multilayer structure to impart different desirable properties or modify existing properties such as toughness, rigidity, and thermoformability to the structure. For example, to the two layer laminate described above, a third layer may be laminated to the first barrier layer to impart additional toughness to the laminate. Preferably, the third layer contains a polyethylene terephthalate glycol (PETG). The inclusion of polyethylene terephthalate glycol in the scrap containing second layer has been found not to adversely affect the properties of the laminate structure. The third layer could also be a nylon, if so desired. In fact, when a nylon third layer is used it may be omitted from the barrier layer blend. In that instance the barrier layer would preferably contain a polyvinylidene chloride copolymer and a polyether blockamide compatibilizing agent.

It should be noted that any or all layers of the multilayer structure may be colored, if desired. Likewise, fillers, pigments, dyes, antistatic compounds, bacteriosides, and other common additives may be included in one or more of the layers of the structure.

Finally, other plastics besides polyvinylidene chloride or copolymer, (e.g., Saran) may also be utilized as the barrier layer. For example, a copolymer of ethylene and vinyl alcohol may be used as a barrier layer. Additionally, blends of ethylene and vinyl alcohol copolymer with polyethylene and a compatibilizing agent also may serve as the barrier layer and other barrier materials may be used as long as it has an oxygen permeability of 5 or less as measured in cc per mil per 100 sq. in. per day per atmosphere at 23° C. Generally saran resins have an oxygen permeability of 0.05-0.15; EVOH, a rate of around 0.02; nitrile barrier resins, a rate of around 0.8; nylons, a rate of around 2-3; and polyesters, a permeability of around 3-4.

It has been found that the multilayered structures of the present invention have a sufficient bond between the lamina to permit thermoforming, and even after thermoforming, sufficient barrier properties are retained to render the thermoformed container suitable for most food products. Most significantly, the multilayered structure may be coextruded without surface degradation of the outer layers. Previously with barrier layer laminates, it was necessary to encapsulate the saran barrier layer since saran could not be used as a surface layer because of degradation and sticking to the die during extrusion. The barrier layer blends of the present invention do not have the drawback and may be used as the surface layer in the multilayered structure. All of this is accomplished without utilization of intermediate adhesive layers as is common in the prior art. As such, cost advantages are obtained and fewer extruders need be used. In fact, elimination of adhesive layers makes it desirable for co-extrusion of the multilayered structures of the present invention using a multi-manifold die and avoids the necessity of using a feedback extrusion system.

Accordingly, it is an object of the present invention to provide a thermoformable multilayer barrier structure which has no adhesive layers and which includes at least one layer which utilizes scrap material produced from the multilayer structure. This, and other objects and advantages of the invention will become apparent from the following detailed description and appended claims.

DETAILED DESCRIPTION OF THE PREFERRED EMBODIMENTS

The thermoformable multilayer barrier structure and composition of the present invention makes possible the joining of a layer of a barrier plastic resin blend, i.e., one which possesses low gas and vapor transmission rates, to a thermoformable blend layer of polyolefin and polystyrene along with scrap material. The material of the present invention may be produced using conventional extrusion techniques such as feedblock coextrusion, multimanifold die coextrusion, or combinations of the two, or may be produced by a laminating procedure whereby self-sustaining lamina are bonded together by applications of heat and pressure. Preferred is a feedblock coextrusion process. The volume (thickness) of each individual layer may be controlled as it is extruded. Thus, the overall thickness of the multilayer structure may be controlled to produce a film or sheet of desired thickness.

Generally, it would not be expected that a barrier film layer would adhere to or could be joined to a second polyolefin containing layer without the use of bonding agents between the layers. Additionally, it would not be expected that scrap material from a barrier layer and polyolefin layer could be reground and blended with the polyolefin containing layer without adversely affecting the physical properties of the multilayer structure or its ability to adhere to other layers. The practice of the present invention, however, makes it possible to do so through the use of proper selection and blending of the components of each layer and through the use of compatibilizing agents.

The barrier layer of the multilayer structure of the present invention preferably includes two or three components: (a) a polymer resin having low gas and vapor transmission properties, (b) a compatible or incompatible polymer, and (c) a compatibilizing polymer for the first two components if an incompatible polymer is used. Preferred resins having good barrier properties include copolymers of vinylidene chloride and one or more monoethylenically unsaturated monomers copolymerizable therewith, and copolymers of ethylene and vinyl alcohol.

When a vinylidene chloride copolymer is utilized, the copolymer preferably has polymerized therein vinylidene chloride in an amount of from about 40 to 98% by weight of copolymer and at least one monoethylenically unsaturated copolymerizable monomer in an amount of from about 60 to about 2% by weight of interpolymer. The copolymerizable monomer may be a vinyl functional monomer such as vinyl chloride; alkyl esters of acrylic and methacrylic acids such as alkyl acrylates and alkyl methacrylates; ethylenically unsaturated mono- and dicarboxylic acids such as acrylic acid, methacrylic acid, and itaconic acid; and cyano-functional monomers such as acrylonitrile and methacrylonitrile.

The other polymer in the blend may be either a compatible one, such as PETG, or an incompatible one such as a polyolefin or a nylon. Preferred are the polyolefins.

The olefin polymer component of the barrier layer is typically on olefinic homopolymer or copolymer such as low, medium or high density polyethylene; polypropylene; poly 1-butene; generally linear copolymers of ethylene and at least one 1-alkene having from 3 to 18 carbon atoms; copolymers of two or more alpha-olefins having from 3 to 18 carbon atoms per molecule; rubbery ethylene-propylene-diene terpolymers; and mixtures of the above. Generally, the weight ratio of the barrier resin component to olefin polymer component is from about 9:1 to about 5:4.

The compatibilizing agent for the barrier resin and olefin polymer is preferably a copolymer of ethylene and at least one oxygen containing monomer compolymerizable therewith, or one acid containing monomer, such as acrylic acid, or a halogenated olefin polymer. Examples of copolymers of ethylene and an oxygen containing monomer include ethylene copolymers having polymerized therein from about 97 to about 60 weight percent of ethylene and from about 3 to about 40 weight percent of at least on ethylenically unsaturated carboxylic acid monomer copolymerizable therewith. The copolymer may be esterified after preparation thereof; copolymers of ethylene and at least one alkyl acrylate, the alkyl acrylate having from about 1 to about 8 carbon atoms per alkyl group; copolymers of ethylene and at least one alkyl methacrylate, the alkyl methacrylate having from about 1 to about 8 carbon atoms per alkyl group; copolymers of ethylene and carbon monoxide; interpolymers of ethylene, carbon monoxide and (1) an ester of an ethylenically unsaturated carboxylic acid or (2) vinyl acetate; copolymers of ethylene and vinyl acetate; and ethyl oxazoline modified copolymers of ethylene and acrylic acid.

Examples of halogenated olefin polymers include olefin polymers having halogen atoms chemically affixed thereto in amounts of from 24 to 44% by weight of the polymer. A more detailed discussion of the components for the preferred barrier layer is found in commonly-assigned copending U.S. application Ser. No. 713,095, filed Mar. 18, 1985 as a continuation-in-part of Ser. No. 610,716, filed May 16, 1984, the disclosure of which is hereby incorporated by reference. Generally, the preferred barrier layer comprises about 65-75% by weight of barrier resin 15-25% by weight of olefin polymer, and 7-12% by weight of compatibilizing agent. The same weight percentages may be used when a nylon polymer is used instead of an olefin one.

The thermoformable blend layer of the multilayer structure which renders the material thermoformable is a blend of an olefin polymer component, including an olefinic polymer, a styrenic polymer, and a compatibilizing amount of a compatibilizing polymer, and a scrap material component. The olefin polymer component may be an alpha-olefin such as low, medium, or high density polyethylene, polypropylene, poly 1-butene, or mixtures thereof. Also suitable are copolymers of ethylene and propylene or copolymers of ethylene and/or propylene with other copolymerizable monomers. The olefin polymer component preferably makes up about 45-65% by weight of the blend.

The styrenic polymer component may be a commercially available general purpose or high impact polystyrene. Additionally, other styrene polymers and suitable copolymers such as alkyl styrenes, styrene-acrylonitrile, styrene acrylic acid, ring-substituted alkyl styrenes, and halogen-substituted styrenes may be utilized. The styrene component preferably makes up about 25-35% by weight of the blend.

The compatibilizing polymer component of the blend should be selected so that it is capable of functioning as a compatibilizer for the olefin and styrene components. Preferably, the compatibilizng polymer is a block copolymer having both olefin polymer and styrene polymer compatibility characteristics. Examples of suitable block copolymers are styrene-butadiene, styrene-butadiene-styrene, styrene-ethylene-butadiene, styrene-isoprene, and styrene-isoprene-styrene block copolymers and mixtures thereof. Preferred is an 80/20 mixture of a styrene-butadiene block copolymer and a styrene-butadiene-styrene block copolymer. The amount of compatibilizing copolymer sufficient to compatibilize the blend may vary depending on the particular components of the blend. However, it is preferred that the compatibilizing polymer be employed in the range of from 2 to 20% by weight, and most preferably 4 to 10% by weight of the blend.

Scrap material produced from thermoforming the multilayer structure of the present invention may be recovered, reground, and recycled for use as a component in the polyolefin containing layer. Such scrap material will contain components from both the barrier layer and polyolefin containing layer. As the material of the present invention is produced and thermoformed, the scrap composition in the polyolefin containing layer will reach a steady state level if total recycling of scrap is utilized. This steady state level will vary depending on the overall amount of scrap produced relative to the amount of material utilized in the thermoforming process. This level will of course vary depending on the type of container or package being formed. The amount of scrap utilized in the polyolefin containing layer may vary widely and may make up from 1 to 99% by weight, and preferably about 10 to 60% by weight, of the polyolefin containing layer.

The present invention also contemplates other combinations of multilayer structures. Additional layers may be added to the basic two layer (barrier and polyolefin containing) structure. For example, a polyethylene terephthalate glycol (PETG) layer may be coextruded with or laminated to the barrier layer to provide a material with improved toughness and rigidity for thermoforming. When an ethylene vinyl alcohol (EVOH) blend is used as the barrier layer, it is particularly desirable to have a PETG surface layer since EVOH is not a good surface layer for food packages because of moisture absorption. Other multilayer structures utilizing the barrier layer as an inner core layer with outer polyolefin containing face layers may also be produced. The inclusion of scrap material from these additional layers as a component in one or more of the layers has been found not to adversely affect the properties of the overall multilayer structure.

In order that the invention may be more readily understood, reference is made to the following examples, which are intended to illustrate the invention but are not to be taken as limiting the scope thereof. All parts and percentages are by weight unless otherwise specified or required by context.

EXAMPLE 1

A two-layer coextrusion was undertaken at a total of 250 lbs/hr to produce a 0.130 inch thick multilayer structure 26⅜" wide. The first layer comprised 15% by volume of the total coextrudate and consisted of (by weight) a blend of:
72% vinylidene chloride copolymer (Saran XU 32009.00 from Dow Chemical),
20% high density polyethylene (HDPE 4052N from Dow Chemical), and
8% ethylene ethyl acrylate (EEA 6182 from Union Carbide).

The second layer was a 50—50 weight combination of a polymer blend and a simulated regrind (scrap) material and constituted 85% by volume of the coextrudate. The simulated regrind consisted of (by weight):
45% high density polyethylene,
23% general purpose polystyrene (XP 71008.00 from Dow Chemical),
4% styrene-butadiene diblock (HX 649-A from Firestone),
24% vinylidene chloride copolymer (Saran XU 32009.00), and
4% ethylene ethyl acrylate (EEA 6182).

The blend consisted of (by weight):
54% high density polyethylene,
35% general purpose polystyrene, and
11% styrene-butadiene diblock (HX 649-A).

These materials were blended in a 50/50 ratio to produce the final second layer composition as follows:
49.5% high density polyethylene,
29% general purpose polystyrene,
7.5% styrene-butadiene diblock (HX 649-A),
12% vinylidene chloride copolymer (Saran XU32009.00), and
2% ethylene ethyl acrylate (EEA 6182).

The two coextrudates were coextruded through a Dow feedblock. The first layer was extruded on a 2½", 21:1 L/D Sterling extruder at a polymer temperature of 360° F. The second layer was extruded on a 2½", 30:1 L/D Sterling extruder at a polymer temperature of 400° F. Coextrusion continued for 5 consecutive hours with no evidence of saran degradation in either layer.

Following coextrusion, a portion of the multilayer structure was tested for bond strength. The 90° peel strength of the 2 layers was 1.4 in-lbs.

Another portion of the multilayer structure was thermoformed on a standard thermoformer, Brown 2100, into cylindrical containers, 3.1875" I.D.×4.35" depth, 1° sidewall taper. Sheet surface polymer temperature at the forming station was 350° F. as measured by an I.R. pyrometer. The inside of the container is the saran blend (first layer).

The 15/85 ratio of first layer to second layer remained constant regardless of different thicknesses in final thermoformed part such as in flange, sidewall and bottom, indicating adequate adhesion of the two layers.

EXAMPLE 2

A two-layer coextrusion was undertaken utilizing a Dow Chemical feedblock coextruder at 40 lbs/hr to produce a 0.045 inch thick multilayer structure.

The first layer comprised 15% by volume of the total coextrudate and consisted of (by weight) a blend of:
75% vinylidene chloride copolymer (Saran XU32009.00 from Dow Chemical), and
25% polyethylene terephthalate glycol (Eastman 5116 from Tennessee Eastman).

The second layer was a 50—50 weight combination of a polymer blend and a simulated regrind (scrap) material and constituted 85% by volume of the coextrudate. It had a combined, final second layer composition by weight of:
13% vinylidene chloride copolymer (Saran XU32009.00 from Dow Chemical),
4.5% polyethylene terephthalate glycol (Eastman 5116 from Tennessee Eastman),
29% general purpose polystyrene,
7.5% styrene-butadiene diblock/styrene-butadiene-styrene triblock (Kraton 1118 from Shell), and
46% high density polyethylene.

The two coextrudates were coextruded through a Dow feedblock. The first layer was coextruded on a 1¼", 16:1 L/D, extruder and the second layer on a 1¾", 24:1 L/D Prodex extruder. Coextrusion was accomplished with no evidence of saran degradation.

Multilayer structure as so produced was thermoformed into trays 2½"×4"×1¼" deep on a Brown 35 thermoformer. The 15/85 ratio of first layer to second layer remained constant with the variable thicknesses of the flanges, sidewall and bottom, indicating adequate adhesion between the two layers.

EXAMPLE 3

A three-layer coextrusion was undertaken to produce a 0.045 inch thick multilayer structure.

The first layer comprised 5% by volume of the total coextrudate and consisted of polyethylene terephthalate glycol polymer.

The second layer comprised 15% by volume of the total coextrudate and consisted of (by weight) a blend of:
72% vinylidene chloride copolymer (Saran XU32009.00 from Dow Chemical),
20% high density polyethylene, and
8% ethylene ethyl acrylate (EEA 6182 from Union Carbide).

The third layer comprised 80% by volume of the total extrudate and consisted of a 50-50 weight combination of a polymer blend and a simulated regrind (scrap) material. It had a combined, final second layer composition by weight of:
12% vinylidene chloride copolymer (Saran XU32009.00 from Dow Chemical),
3% polyethylene terephthalate glycol,
2% ethylene ethyl acrylate (EEA 6182 from Union Carbide),
29% general purpose polystyrene,
7.5% styrene-butadiene diblock (HX 649-A from Firestone), and
46.5% high density polyethylene.

The three coextrudates were coextruded through a Dow feedblock. The first layer was coextruded on a 1", 24:1 L/D extruder at 410° F.; the second layer on a 1¼", 16:1 L/D extruder at 370° F.; and the third layer on a 1¾", 24:1 L/D Prodex extruder at 380° F.

Multilayered structure as so produced was thermoformed into trays 2½"×4"×1¼" deep on a Brown 35 thermoformer. Adequate adhesion between the three layers was observed.

EXAMPLE 4

Various two-layer coextrusions were formed and tested to determine optimum ingredient levels. Optimum in this instance being defined as the best combination to give toughness, stiffness and thermoformability. Toughness and stiffness were measured by dart driven impact (Rheometrics Model RIT-8000) at 500 inches/minute. Toughness is defined as energy at the point of maximum force in inch-pounds; relative stiffness as the slope of the deformation curve in pounds/inch.

The starting point, two-layer structure was:
First layer (by weight) of:
72% vinylidene chloride copolymer (Saran XU32009.00 from Dow Chemical), "Saran",
20% high density polyethylene, "HDPE", and
8% ethylene ethyl acrylate (EEA 6182 from Union Carbide), "EEA".

Second layer—50-50 combination of polymer blend and scrap (regrind), having a final second layer composition by weight of:
49.5% high density polyethylene, "HDPE",
29% general purpose polystyrene, "GPPS",
7.5% styrene-butadiene-styrene triblock (Kraton 1102), "K-1102",
12% vinylidene chloride copolymer (Saran XU32009.00 from Dow Chemical), "Saran",
2% ethylene ethyl acrylate (EEA 6182 from Union Carbide), "EEA", and
3pphp white concentrate.

A number of parameters of the second layer of this multilayer structure were varied with the following results:

| Ultimate Energy (IN-LBS) | |
|---|---|
| VARIANT | ULTIMATE ENERGY (IN-LBS) |
| STD | 40 |
| 7% K-1102 W/EMA | |
| 43% HPDE | 19 |
| 50% HPDE | 31 |
| 57% HPDE | 41 |
| 7% K-1102 W/EMA (straight) 50% HPDE | 31 |
| 7% K-1102 W/EMA (regrind) 50% HPDE | 45 |
| 7% K-1102 W/EEA 50% HPDE | 36 |
| 8% K-1102 W/EEA 50% HPDE | 39 |

| Stiffness (LBS/IN) | |
|---|---|
| VARIANT | ULTIMATE ENERGY (LBS/IN) |
| STD | 730 |
| 7% K-1102 W/EMA | |
| 25% GPPS | 652 |
| 30% GPPS | 665 |
| 35% GPPS | 710 |
| 7% K-1102 W/EMA (straight) 29% GPPS | 662 |
| 7% K-1102 W/EMA (regrind) 29% GPPS | 702 |
| 7% K-1102 W/EEA 29% GPPS | 680 |
| 8% K-1102 W//EEA 29% GPPS | 650 |

| DRIVEN DART IMPACT DATA HDPE/GPPS LEVELS | | | | |
|---|---|---|---|---|
| Percent HDPE/GPPS | ENERGY AT MAXIMUM LOAD (lbs-in) | ULTIMATE DISTANCE (mils) | ULTIMATE FORCE (lbs) | SLOPE (lbs/in) |
| (1) 64/30 (STD) | 40.0 | 476.2 | 219.1 | 729.4 |
| (2) 55/24 | 40.6 | 528.2 | 202.1 | 652.1 |
| (3) 49/30 | 31.7 | 479.8 | 195.4 | 663.9 |
| (4) 43/36 | 20.0 | 414.5 | 116.2 | 708.0 |
| (5) 51/28 | 44.7 | 455.8 | 224.6 | 702.3 |

Note: Sample (1) above contains no regrind; 6% K-1102 Samples (2) through (5) all contain: 12% Saran, 2% EEA, 7% K-1102 (50/50 virgin + regrind)

| ACTUAL REGRIND VS. SIMULATED REGRIND | | | | |
|---|---|---|---|---|
| | ENERGY AT MAXIMUM LOAD (in-lbs) | ULTIMATE DISTANCE (mils) | ULTIMATE FORCE (lbs) | SLOPE (lbs-in) |
| Actual Regrind (50%) | 44.7 | 455.8 | 224.6 | 702.3 |
| Simulated Regrind (50%) | 31.5 | 423.7 | 196.6 | 661.6 |

| EMA VS. EEA | | | | |
|---|---|---|---|---|
| | ENERGY AT MAXIMUM LOAD (in-lbs) | ULTIMATE DISTANCE (mils) | ULTIMATE FORCE (lbs) | SLOPE (lbs-in) |
| EMA | 31.5 | 423.7 | 196.6 | 661.6 |
| | (28.8) | (433.5) | (193.4) | (675.5) |
| EEA | 36.1 | 435.7 | 210.4 | 680.1 |
| | (28.1) | (428.2) | (192.5) | (694.0) |

| KRATON 1102 LEVEL | | |
|---|---|---|
| FORMULATIONS: | 1 | 2 |
| HDPE | 51.0 | 50.0 |
| GPPS | 28.0 | 28.0 |
| KRATON 1102 | 7.0 | 8.0 |
| SARAN XU32009.00 | 12.0 | 12.0 |
| EEA 6182 | 2.0 | 2.0 |

| Kraton 1102 Level | ENERGY AT MAXIMUM LOAD (in-lbs) | ULTIMATE DISTANCE (mils) | ULTIMATE FORCE (lbs) | SLOPE (lbs-in) |
|---|---|---|---|---|
| 7% | 36.1 | 435.7 | 210.4 | 680.1 |
| 8% | 39.0 | 459.2 | 214.1 | 651.2 |

| EFFECT OF WHITE CONCENTRATE ON CHOSEN FORMULATION | | | | |
|---|---|---|---|---|
| Level of White Concentrate (pphp) | ENERGY AT MAXIMUM LOAD (in-lbs) | ULTIMATE DISTANCE (mils) | ULTIMATE FORCE (lbs) | SLOPE (lbs-in) |
| 0 | 52.1 | 436.2 | 276.8 | 831.4 |
| 3 | 58.3 | 465.6 | 280.5 | 801.4 |

Conclusions which can be reached based on this comparative data are:

(a) that a 50(49.5)% HDPE/29% GPPS level in the second layer is within ±1% of being optimum;
(b) that use of actual regrind is favorable;
(c) that EEA is to be preferred over EMA; and
(d) that increased K-1102 level is favorable.

Other tests have shown that a diblock styrene-butadiene is preferred over the styrene-butadiene-styrene triblock K-1102, and accordingly, styrene-butadiene diblock (HX 649-A from Firestone) is preferred as shown in Examples 1 and 3. Actually, most preferred is a mixture (such as an 80/20 mixture) of styrene-butadiene diblock and styrene-butadiene styrene triblock (Kraton 1118) as shown in Example 2.

EXAMPLE 5

A three-layer coextrusion was undertaken to produce a 0.045 inch thick multilayer structure.

The first layer comprised 5% by volume of the total coextrudate and consisted of polyethylene terepthalate glycol polymer.

The second layer comprised 15% by volume of the total extrudate and consisted of (by weight) a blend of:
72% ethylene vinyl alcohol copolymer,
20% high density polyethylene, and
8% maleic anhydride grafted polypropylene (Admer QF 500).

The third layer comprised 80% by volume of the total extrudate and consisted of a 50-50 weight combination of a polymer blend an a simulated regrind (scrap) material. In this instance the simulated regrind (scrap) material contains saran, as in the earlier examples, although obviously in practice the actual regrind will contain ethylene vinyl alcohol since that is the alternative barrier material used in this example. It had a combined, final second layer composition by weight of:
12% vinylidene chloride copolymer (Saran XU32009.00 from Dow Chemical),
3% polyethylene terephthalate glycol,
2% ethylene ethyl acrylate (EEA 6182 from Union Carbide),
29% general purpose polystyrene,
7.5% styrene-butadiene diblock (HX 649-A from Firestone), and
46.5% high density polyethylene.

The three coextrudates were coextruded through a Dow feedblock. The first layer was coextruded on a 1", 24:1 L/D extruder at 410° F.; the second layer on a 1¼", 16:1 L/D extruder at 370° F., and the third layer on a 1¾", 24:1 L/D Predex extruder at 380° F.

Multilayered structure as so produced was thermoformed into trays 2½"×4"×1¼" deep on a Brown 35 thermoformer. Adequate adhesion between the three layers was observed.

Having described the invention in detail and by reference to preferred embodiments thereof, it will be apparent that modifications and variations are possible without departing from the scope of the invention defined in the appended claims.

What is claimed is:

1. A thermoformable multilayer structure comprising as components:
    a first layer comprising (a) a vinylidene chloride polymer, the copolymer having polymerized therein vinylidene chloride in an amount of from 40 to 98% by weight of copolymer and at least one monoethylenically unsaturated monomer copolymerizable therewith in an amount of from 60 to 2% by weight of copolymer; (b) an incompatible polymer; and (c) a sufficient amount of a compatibilizing agent for said incompatible polymer; and
    a second layer comprising a combination of (a) from 1 to 99% by weight of a blend of an olefinic polymer, a styrenic polymer, and a sufficient amount of a compatibilizing polymer for said olefinic and styrenic polymers; and (b) from 99 to 1% by weight of scrap material produced from said first and second layers.

2. The multilayer structure of claim 1 wherein said first layer comprises 65-75% by weight of component (a), 15-25% by weight of component (b), and 7-12% by weight of component (c).

3. The multilayer structure of claim 2 wherein said incompatible polymer is a polyolefin and said compatibilizing agent is selected from the group consisting of (i) ethylene copolymers having polymerized therein from 97 to 60 weight percent ethylene and from 3 to 40 weight percent of at least one oxygen containing monomer copolymerizable therewith or one acid containing monomers; and (ii) olefin polymers having halogen chemically affixed thereto in an amount of from 24 to 44% by weight of polymer.

4. The multilayer structure of claim 3 wherein said compatibilizing agent is selected from the group consisting of copolymers of ethylene and at least one alkyl acrylate, the alkyl acrylate having from about 1 to about 8 carbon atoms per alkyl group; copolymers of ethylene and at least one alkyl methacrylate, the alkyl methacrylate having about 1 to about 8 carbon atoms per alkyl group; copolymers of ethylene and carbon monoxide; interpolymers of ethylene, carbon monoxide and either an ester of an ethylenically unsaturated carboxylic acid or vinyl acetate; copolymers of ethylene and vinyl acetate; and ethyl oxazoline modified copolymers of ethylene and acrylic acid.

5. The multilayer structure of claim 2 wherein said incompatible polymer is a nylon and said compatibilizing agent is a polyether blockamide.

6. The multilayer structure of claim 1 including a third layer joined to said first layer, said third layer comprising a polyethylene terephthalate glycol, and the (b) component of said second layer comprises scrap material produced from said first, second, and third layers.

7. The multilayer structure of claim 1 in which said scrap material comprises 50% by weight of said second layer.

8. The multilayer structure of claim 1 in which said compatibilizing polymer for said olefinic and styrenic polymers in said second layer is selected from the group consisting of block copolymers of styrene-butadiene-styrene, styrene-butadiene, styrene-ethylene-butadiene, styrene-isoprene, styrene-isoprene-styrene, and mixtures thereof.

9. The multilayer structure of claim 1 in which said compatibilizing polymer for said olefinic and styrenic polymers in said second layer is a styrene-butadiene block copolymer.

10. The multilayer structure of claim 1 in which said compatibilizing polymer for said olefinic and styrenic polymers in said second layer is an 80/20 mixture of a styrene-butadiene block copolymer and a styrene-butadiene-styrene block copolymer.

11. A thermoformable multilayer barrier structure comprising as components:
    (a) a barrier layer having first and second major faces, said barrier layer comprising a copolymer of ethylene and vinyl alcohol or a blend of (i) a copolymer of ethylene and vinyl alcohol, (ii) an olefinic polymer, and (iii) a sufficient amount of a compatibilizing agent;

(b) a first cover layer disposed on and joined to said first major face of said barrier layer, said first cover layer comprising a polyethylene terephthalate glycol; and (c) a second cover layer disposed on and joined to said second major face of said barrier layer, said second cover layer comprising (i) from 1 to 99% by weight of a blend of an olefinic polymer, a styrene polymer, and a sufficient amount of a compatibilizing polymer for said olefinic and styrenic polymers, and (ii) from 99 to 1% by weight of scrap material produced from said barrier layer and said first and second cover layers.

12. The multilayer barrier structure of claim 11 in which said barrier layer comprises 65-75% by weight of a copolymer of ethylene and vinyl alcohol, 15-25% by weight polyolefin, and 4-10% by weight maleic anhydride modified polypropylene.

13. The multilayer structure of claim 12 in which said barrier layer makes up 15% by volume of the multilayer structure.

14. The multilayer structure of claim 13 in which said first cover layer makes up 5% by volume and said second cover layer makes up 80% by volume of the structure.

15. The multilayer structure of claim 11 in which said second cover layer comprises 50% by weight of component (i) and 50% by weight of component (ii).

16. A thermoformable multilayer structure comprising as components:
a first layer of barrier material having an oxygen permeation rate of 5 or lower as measured in cc per mil per 100 sq. in. per day per atmosphere at 23° C.; and
a second layer comprising a combination of (a) from 1 to 99% by weight of a blend of an olefinic polymer, a styrenic polymer, and a sufficient amount of a compatibilizing polymer for said olefinic and styrenic polymers; and (b) from 99 to 1% by weight of scrap material produced from said first and second layers.

17. The multilayer structure of claim 16 in which said first layer of barrier material makes up 15% by volume of the multilayer structure.

18. The multilayer structure of claim 16 including a third layer joined to said first layer, said third layer comprising a polyethylene terephthalate glycol, and the (b) component of said second layer comprises scrap material produced from said first, second, and third layers.

19. The multilayer structure of claim 18 wherein said third layer makes up 5% by volume and said second layer makes up 80% by volume of the structure.

20. The multilayer structure of claim 16 in which said first layer is selected from the group consisting of a blend of (a) a vinylidene chloride copolymer, the copolymer having polymerized therein vinylidene chloride in an amount of from 40 to 98% by weight of copolymer and at least one monoethylenically unsaturated monomer copolymerizable therewith in an amount of from 60 to 2% by weight of copolymer; (b) a compatible or incompatible polymer; and a copolymer of ethylene and vinyl alcohol or a blend of (i) a copolymer of ethylene and vinyl alcohol, (ii) an olefinic polymer, and (iii) a sufficient amount of a compatibilizing agent.

21. A thermoformable multi-layer barrier structure comprising as components:
(a) a barrier layer having first and second major faces, said barrier comprising a blend of a copolymer of polyvinylidene chloride and a polyether blockamide;
(b) a first cover layer disposed on and joined to said first major face of said barrier layer, said first cover layer comprising a nylon; and
(c) a second cover layer disposed on and joined to said second major face of said barrier layer, said second cover layer comprising (i) from 1 to 99% by weight of a blend of an olefinic polymer, a styrene polymer, and a sufficient amount of a compatibilizing polymer for said olefinic and styrenic polymers, and (ii) from 99 to 1% by weight of scrap material produced from said barrier layer and said first and second cover layers.

22. A thermoformable multilayer structure comprising as components:
a first layer comprising (a) a vinylidene chloride polymer, the copolymer having polymerized therein vinylidene chloride in an amount of from 40 to 98% by weight of copolymer and at least one monoethylenically unsaturated monomer copolymerizable therewith in an amount of from 60 to 2% by weight of copolymer; and (b) a compatible polymer; and
a second layer comprising a combination of (a) from 1-99% by weight of a blend of an olefinic polymer, a styrenic polymer, and a sufficient amount of a compatibilizing polymer for said olefinic and styrenic polymers; and (b) from 99 to 1% by weight of scrap material produced from said first and second layers.

23. The multilayer structure of claim 22 including a third layer joined to said first layer, said third layer comprising a polyethylene terephthalate glycol, and the (b) component of said second layer comprises scrap material produced from said first, second, and third layers.

24. The multilayer structure of claim 22 in which said scrap material comprises 50% by weight of second second layer.

25. The multilayer structure of claim 22 in which said compatibilizing polymer for said olefinic and styrenic polymers in said second layer is selected from the group consisting of block copolymers of styrene-butadiene-styrene, styrene-butadiene, styrene-ethylene-butadiene, styrene-isoprene, styrene-isoprene-styrene, and mixtures thereof.

26. The multilayer structure of claim 22 in which said compatibilizing polymer for said olefinic and styrenic polymers in said second layer is a styrene-butadiene block copolymer.

27. The multilayer structure of claim 22 in which said compatibilizing polymer for said olefinic and styrenic polymers in said second layer is an 80/20 mixture of a styrene-butadiene block copolymer and a styrene-butadiene-styrene block copolymer.

* * * * *